(12) United States Patent
Villa et al.

(10) Patent No.: US 12,595,052 B2
(45) Date of Patent: Apr. 7, 2026

(54) TILT ROTOR VERTICAL TAKE-OFF AND LANDING AERIAL VEHICLE

(71) Applicant: Joby Aero, Inc., Santa Cruz, CA (US)

(72) Inventors: Ian Andreas Villa, San Francisco, CA (US); Jacek Kawecki, San Francisco, CA (US); Jalen Christian Doherty, San Francisco, CA (US); Ryan Naru, Oakland, CA (US); Mark Moore, Henderson, NV (US); Alex Michael Gary, San Luis Obispo, CA (US); Adam Chase, San Luis Obispo, CA (US); Matthew William Derkach, San Francisco, CA (US); Philipp Haban, Pittsburgh, PA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/660,775

(22) Filed: May 10, 2024

(65) Prior Publication Data

US 2024/0308655 A1     Sep. 19, 2024

Related U.S. Application Data

(63) Continuation of application No. 17/247,344, filed on Dec. 8, 2020, now Pat. No. 12,006,033, which is a
(Continued)

(51) Int. Cl.
| | |
|---|---|
| *B64C 29/00* | (2006.01) |
| *B64C 39/04* | (2006.01) |
| *B64F 5/10* | (2017.01) |

(52) U.S. Cl.
CPC ...... *B64C 29/0033* (2013.01); *B64C 29/0025* (2013.01); *B64C 39/04* (2013.01); *B64F 5/10* (2017.01)

(58) Field of Classification Search
CPC ................................................... B64C 29/0033
See application file for complete search history.

(56) References Cited

U.S. PATENT DOCUMENTS

| | | | |
|---|---|---|---|
| 865,636 | A | 9/1907 | Eveland |
| 3,089,666 | A | 5/1963 | Quenzler |

(Continued)

FOREIGN PATENT DOCUMENTS

| | | |
|---|---|---|
| WO | 2015143098 | 9/2015 |
| WO | WO-2022029435 A1 | 2/2022 |

OTHER PUBLICATIONS

"3rd Generation Tiltrotor Technology Demonstrator", https://www.militaryfactory.com/aircraft/detail.asp?aircraft_id=1065, (Dec. 18, 2019), 5 pgs.

(Continued)

*Primary Examiner* — William L Gmoser
(74) *Attorney, Agent, or Firm* — Schwegman Lundberg & Woessner, P.A.

(57) ABSTRACT

An aerial vehicle includes a fuselage supporting a pair of wings, with each of wings having a pair of booms attached thereto. A tilt rotor is positioned at each of the forward ends of each of the booms, to provide the aerial vehicle with at least four tilt rotors. A fixed rotor is positioned at and secured to the aft (or trailing) ends of each of the booms, to provide the aerial vehicle with at least four fixed rotors.

16 Claims, 13 Drawing Sheets

Related U.S. Application Data continuation of application No. 16/896,983, filed on Jun. 9, 2020, now abandoned.

(60) Provisional application No. 62/859,689, filed on Jun. 10, 2019.

(56) References Cited

U.S. PATENT DOCUMENTS

| | | | |
|---|---|---|---|
| 3,254,725 A | 6/1966 | Higgins | |
| 3,273,827 A | 9/1966 | Girard | |
| 3,592,412 A | 7/1971 | Glatfelter | |
| 5,115,996 A | 5/1992 | Moller | |
| 6,622,962 B1 | 9/2003 | White | |
| 6,719,244 B1 | 4/2004 | Gress | |
| 7,143,973 B2 | 12/2006 | Ballew | |
| 9,242,738 B2 | 1/2016 | Kroo | |
| 9,694,911 B2 | 7/2017 | Bevirt et al. | |
| 9,845,150 B2 | 12/2017 | Kroo | |
| 10,029,785 B2 | 7/2018 | Niedzballa | |
| 10,053,213 B1 | 8/2018 | Tu | |
| 10,189,565 B2 | 1/2019 | Patterson et al. | |
| 10,336,443 B2 | 7/2019 | Louis et al. | |
| 10,364,036 B2 | 7/2019 | Tighe et al. | |
| 10,421,540 B1* | 9/2019 | Koelzer | B64C 27/28 |
| D875,022 S* | 2/2020 | Cummings | D12/326 |
| 10,577,091 B2 | 3/2020 | Parks et al. | |
| 11,485,488 B1* | 11/2022 | Armer | B64C 29/0033 |
| 2003/0094537 A1* | 5/2003 | Austen-Brown | B64D 27/24 244/7 R |
| 2013/0020429 A1 | 1/2013 | Kroo | |
| 2013/0214086 A1 | 8/2013 | Kroo | |
| 2015/0136897 A1 | 5/2015 | Seibel et al. | |
| 2016/0236774 A1 | 8/2016 | Niedzballa | |
| 2016/0236775 A1 | 8/2016 | Eshkenazy et al. | |
| 2016/0304194 A1 | 10/2016 | Bevirt et al. | |
| 2018/0065739 A1 | 3/2018 | Vondrell et al. | |
| 2018/0290742 A1 | 10/2018 | Oldroyd et al. | |
| 2019/0135413 A1 | 5/2019 | Moore et al. | |
| 2019/0135425 A1* | 5/2019 | Moore | B64D 27/31 |
| 2019/0329882 A1* | 10/2019 | Baity | B64U 30/14 |
| 2019/0337613 A1 | 11/2019 | Villa et al. | |
| 2019/0340937 A1 | 11/2019 | Villa | |
| 2020/0140079 A1 | 5/2020 | Campbell | |
| 2020/0156781 A1 | 5/2020 | Kroo et al. | |
| 2020/0164972 A1 | 5/2020 | Kiesewetter et al. | |
| 2020/0269975 A1 | 8/2020 | Fink et al. | |
| 2021/0206487 A1 | 7/2021 | Iqbal et al. | |
| 2021/0245873 A1 | 8/2021 | Tighe et al. | |
| 2021/0362849 A1 | 11/2021 | Bower et al. | |
| 2021/0403154 A1 | 12/2021 | Tighe et al. | |
| 2022/0009626 A1* | 1/2022 | Baharav | B64C 29/0025 |

OTHER PUBLICATIONS

"U.S. Appl. No. 16/896,983, Supplemental Preliminary Amendment filed Oct. 1, 2020", 9 pgs.

"U.S. Appl. No. 17/247,344, Final Office Action mailed Nov. 29, 2023".

"U.S. Appl. No. 17/247,344, Non Final Office Action mailed Apr. 14, 2023".

"U.S. Appl. No. 17/247,344, Notice of Allowance mailed Feb. 14, 2024", 12 pgs.

"U.S. Appl. No. 17/247,344, Response filed Jan. 23, 2024 to Final Office Action mailed Nov. 29, 2023", 8 pgs.

"U.S. Appl. No. 17/247,344, Response filed Aug. 14, 2023 to Non Final Office Action mailed Apr. 14, 2023".

"Bell V-280 Valor", Wikipedia, (Accessed on Nov. 13, 2019), 7 pgs.

"Delta VTOL", AerospaceNU https://aerospacenu.com/index.php/delta-vtol-home/, (Accesssed on Jun. 10, 2019), 3 pgs.

"EHang Displays its Autonomous Aerial Vehicles at International Civil Aviation Organization's Inaugural Innovation Fair", ICAO 2019 ehang com news 570html, (Oct. 5, 2019), 7 pgs.

"Ehang Uam—assenger Autonomous Aerial Vehicle AAV", ehang.com/ehang184/index, 2 pgs.

"MOOG Acquisition of Surefly", MOOG, (2019), 1 pg.

"Rotorcraft", Wikipedia, (Accessed on Apr. 12, 2019), 2 pgs.

"Tiltrotor", Wikipedia https://en.wikipedia.org/wiki/Tiltrotor, 6 pgs.

"VoloCitythe superior air taxifor the inner city", https://www.volocopter.com/en/product/, 2 pgs.

Adams, Eric, "The Heir to the V-22 Osprey Flies Through a Year of Testing", Wired, (Dec. 29, 2010), 6 pgs.

Agrawal, Kanaiya, "Multi-rotors: A Revolution In Unmanned Aerial Vehicle", International Journal of Science and Research (IJSR) Index vol. 4 Issue 11, (Nov. 2015), 5 pgs.

Bacchini, Alessandro, et al., "Electric VTOL Configurations Comparison", aerospace, (Feb. 28, 2019), 19 pgs.

Blain, Loz, "Joby's wild 16-rotor convertible aircraft for long-range, high-Joby's wild 16-rotor convertible aircraft for long-range, highspeed,", https://newatlas.com/joby-s2-tilt-rotor-vtol-multirotor-aircraft-concept/40662/, (Dec. 2, 2015), 4 pgs.

Malaek, Sayed Mohammad-Baghter, et al., "Spricho An On-Demand Energy-Efficient E-VTOL Airtaxi", Research Gate, (May 2019), 102 pgs.

Mizokami, Kyle, "V-22 Osprey Bell Boeing V-22 Osprey History", https://www.popularmechanics.com/military/aviation/a26242129/v-22-osprey-tiltrotor-bell-boeing/, (Feb. 8, 2019), 5 pgs.

Schubarth, Cromwell, "Boeing, Kitty Hawk reorganize and rebrand Mountain View 'flying car' venture", https://www.bizjournals.com/sanjose/news/2019/12/03/boeing-kitty-hawk-reorganize-and-rebrand-mountain.html?ana=yahoo&yptr=yahoo, (Dec. 3, 2019), 3 pgs.

Szondy, David, "Ten-motor electric plane takes off", https://newatlas.com/ten-engine-electric-plane-takes-off/37280/, (May 4, 2015), 7 pgs.

Uber, "Fast-Forwarding to a Future of On-Demand Urban Air Transportation Introduction", Uber Elevate, <URL:https://www.uber.com/elevate.pdf>. [retrieved on Nov. 26, 2018], (Oct. 27, 2016), 98 pgs.

Ward, Richard, "The Long Road to the Tiltrotor", ainonline.com/aviation-news/business-aviation/2018-04-06/long-road-tiltrotor, (Apr. 6, 2018), 8 pgs.

Zhong, Liu, et al., "Control techniques of tilt rotor unmanned aerial vehicle systems: A review", Chinese Journal of Aeronautics CJA 733, (2016), 14 pgs.

U.S. Appl. No. 16/896,983, filed Jun. 9, 2020, Boom Assembly For Aerial Vehicle.

U.S. Appl. No. 17/247,344, filed Dec. 8, 2020, Boom Assembly For Aerial Vehicle.

* cited by examiner

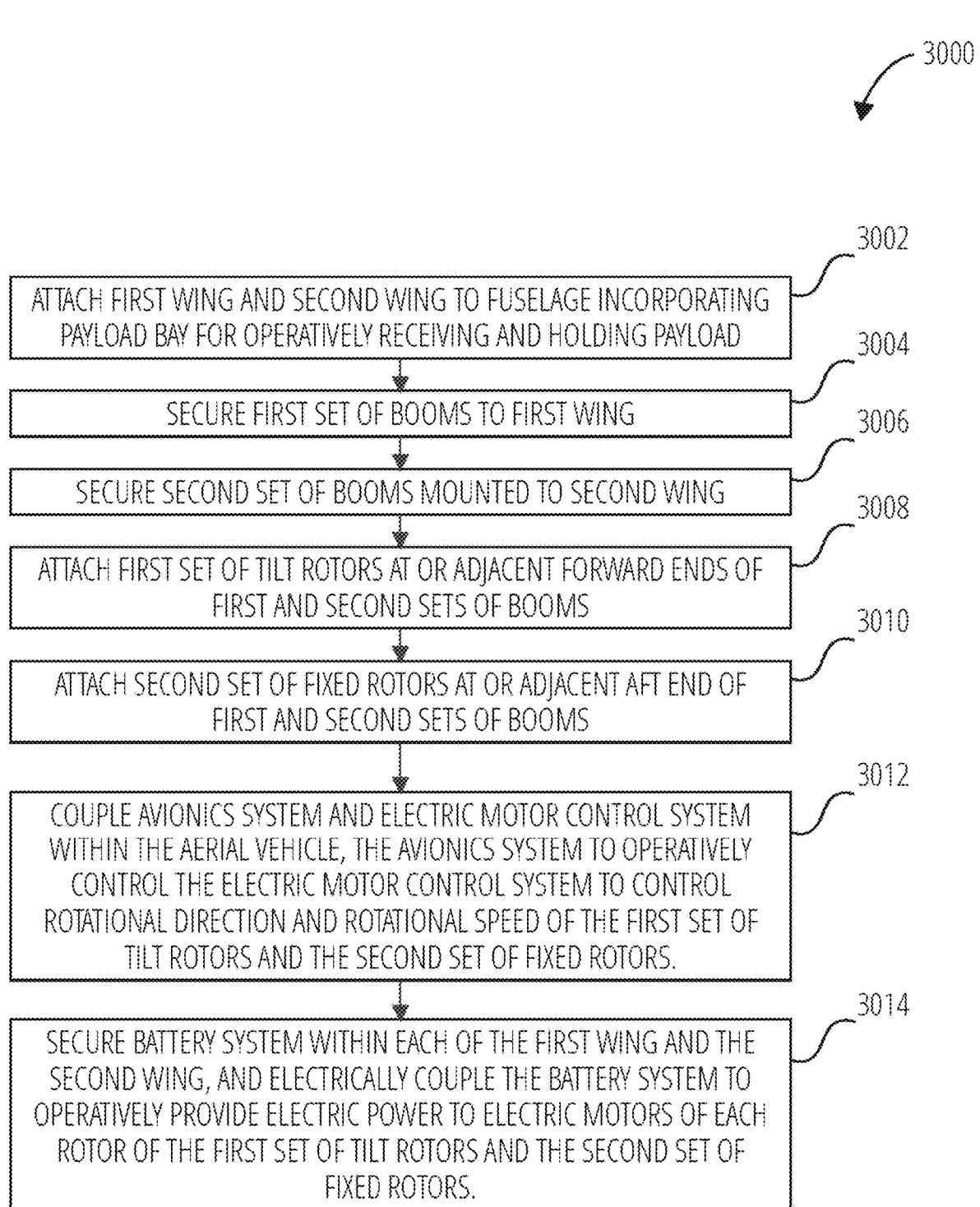

3000

3002

ATTACH FIRST WING AND SECOND WING TO FUSELAGE INCORPORATING PAYLOAD BAY FOR OPERATIVELY RECEIVING AND HOLDING PAYLOAD

3004

SECURE FIRST SET OF BOOMS TO FIRST WING

3006

SECURE SECOND SET OF BOOMS MOUNTED TO SECOND WING

3008

ATTACH FIRST SET OF TILT ROTORS AT OR ADJACENT FORWARD ENDS OF FIRST AND SECOND SETS OF BOOMS

3010

ATTACH SECOND SET OF FIXED ROTORS AT OR ADJACENT AFT END OF FIRST AND SECOND SETS OF BOOMS

3012

COUPLE AVIONICS SYSTEM AND ELECTRIC MOTOR CONTROL SYSTEM WITHIN THE AERIAL VEHICLE, THE AVIONICS SYSTEM TO OPERATIVELY CONTROL THE ELECTRIC MOTOR CONTROL SYSTEM TO CONTROL ROTATIONAL DIRECTION AND ROTATIONAL SPEED OF THE FIRST SET OF TILT ROTORS AND THE SECOND SET OF FIXED ROTORS.

3014

SECURE BATTERY SYSTEM WITHIN EACH OF THE FIRST WING AND THE SECOND WING, AND ELECTRICALLY COUPLE THE BATTERY SYSTEM TO OPERATIVELY PROVIDE ELECTRIC POWER TO ELECTRIC MOTORS OF EACH ROTOR OF THE FIRST SET OF TILT ROTORS AND THE SECOND SET OF FIXED ROTORS.

FIG. 12

TILT ROTOR VERTICAL TAKE-OFF AND LANDING AERIAL VEHICLE

CLAIM FOR PRIORITY

This patent application is a continuation of U.S. patent application Ser. No. 17/247,344 filed on Dec. 8, 2020, which is a continuation of U.S. patent application Ser. No. 16/896, 983 filed on Jun. 9, 2020, which claims the benefit of priority, under 35 U.S.C. Section 119(e), to U.S. Provisional Patent Application Ser. No. 62/859,689 filed on Jun. 10, 2019. The disclosures of U.S. patent application Ser. No. 17/247,344 filed on Dec. 8, 2020, and U.S. Provisional Patent Application Ser. No. 62/859,689, filed on Jun. 10, 2019, are incorporated herein in their entireties as if explicitly set forth.

BACKGROUND

A vertical takeoff and landing (VTOL) aerial vehicle (AV) or aircraft is one that can hover, take off, and land vertically.

For multi-rotor VTOL aircraft, several technical challenges exist with respect to transitioning between cruise and takeoff modes, optimizing lift/drag (L/D) ratio for fuel efficiency, and failure scenario handling. For example, some existing VTOL aircraft use a distributed set of tilting propulsors that rotate in the direction of flight to provide both vertical lift and forward thrust. While this approach reduces motor weight and aircraft drag, the articulating motor and propulsors result in increased design complexity. Helicopters are generally designed to optimize hover efficiency for vertical flight, which generally correlates with a low cruise efficiency.

BRIEF SUMMARY

Examples relate to an aerial vehicle comprising a fuselage supporting a pair of wings (a starboard wing and a port wing), with each of wings having a pair of booms (a mid-wing boom and an outer boom) attached thereto. In one example, a tilt rotor is positioned at or adjacent each of the forward ends of each of the booms, to be forward of a leading edge of a respective wing, and to provide the aerial vehicle with at least four tilt rotors. A fixed rotor is positioned at and secured to the aft (or trailing) end of each of the booms, to be behind the trailing edge of a respective wing, and to provide the aerial vehicle with at least four fixed rotors.

In one example, the four forward tilt rotors are located, on respective booms, forward of a wing so as to enable higher cruises speeds, as well as reduced lift/drag. Specifically, blowing of a wing by these forward-positioned tilt rotors assists in the flow attachment across a transition envelope, and improves the realizable lift coefficient (CI).

Four aft fixed rotors are also operatively located are located, on respective booms, aft of a wing, and aid in wing trailing edge flow circulation.

In a further example, a tilt rotor is attached at or adjacent a forward end of each of the outer booms, and a fixed rotor is attached at or adjacent a forward end of each of the mid-wing booms.

An avionics system operates an electric control system to control the rotational direction, rotational speed, and tilt of each of the tilt rotors. For example, each of the tilt rotors may be tilted at a different angle, and transition between horizontal and vertical positions at different speeds, in order to counter or induce moments. In this way, the propulsive architecture of the aerial vehicle may be controlled to enable both vertical takeoff and horizontal cruising, as well as a combination of takeoff and cruising.

A battery system is located in each of the wings so as to provide electrical energy to electrical motors of the fixed rotor s and the tilt rotors.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 illustrates a method 3000 in accordance with some examples to manufacture an aerial vehicle.

DETAILED DESCRIPTION

According to some examples, there is provided a vertical takeoff and landing (VTOL) aerial vehicle (AV) (a VTOL AV) having electric motors and tilt control systems that seek to minimize design complexity (e.g., through a minimizing component count), while providing a high lift-to-drag (L/D) ratio. Further, the examples seek to provide a VTOL aerial vehicle with a reduced number of points of failure that may result in a catastrophic failure.

Figure 1:
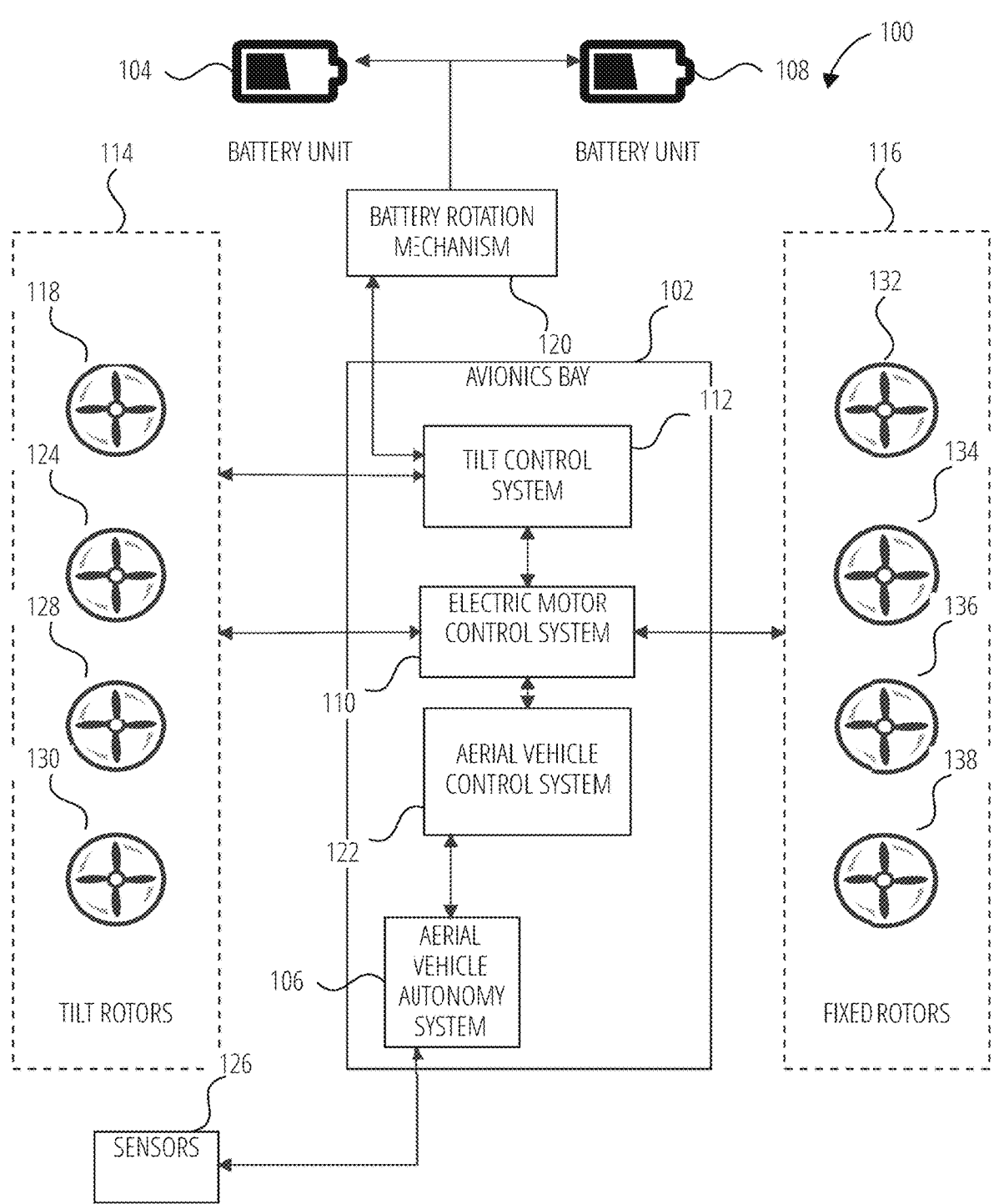
FIG. 1 illustrates an avionics system 100 for an aerial vehicle 200, in accordance with some examples.

FIG. 1 is a block diagram illustrating an avionics system 100 for an aerial vehicle 200, according to some examples. The avionics system 100 includes an aerial vehicle control system 122, an aerial vehicle autonomy system 106, an electric motor control system 110 and tilt control system 112, located within an avionics bay 102 of one of the aerial vehicles (e.g., aerial vehicle 200) discussed herein.

Turning to each of the respective components, the aerial vehicle autonomy system 106 it is responsible for autonomous or semi-autonomous operation of an aerial vehicle and is communicatively coupled to the sensors 126 of the relevant aerial vehicle. The sensors 126 may include LIDAR sensors, radar sensors, and cameras, merely for example. The aerial vehicle autonomy system 106 is communicatively coupled to the primary aerial vehicle control system 122, which is in turn coupled to the various pitch, yaw, and throttle controllers of the aerial vehicle. The aerial vehicle control system 122 may further control the electric motor control system 110. The electric motor control system 110 in turn controls electric motors of the aerial vehicle, including a number of motors that form part of rotors (or propulsors) of the aerial vehicle. These rotors include a set of tilt rotors 114 (e.g., a tilt rotor 118, a tilt rotor 124, a tilt rotor 128, and a tilt rotor 130) and a set of fixed rotors 116 (e.g., a fixed rotor 132, a fixed rotor 134, a fixed rotor 136, and a fixed rotor 138).

The aerial vehicle control system 122 is furthermore communicatively coupled to and controls a tilt control system 112. The tilt control system 112 is responsible for the tilting or rotation of various components (e.g., tilt rotors 114) of the aerial vehicle 200 in order to provide enhanced control and flight stability of the aerial vehicle, as well as the implementation of countermeasures to mitigate the impact of an electrical or component failure of the aerial vehicle.

The tilt control system 112 is communicatively coupled to, and controls, a battery rotation mechanism 120 that is operatively able to move (e.g., rotate or laterally move) a battery unit 104 and a battery unit 108 of a battery system of the aerial vehicle 200. Further details regarding operations of the various systems and subsystems shown in FIG. 1 are described herein.

Figure 2:
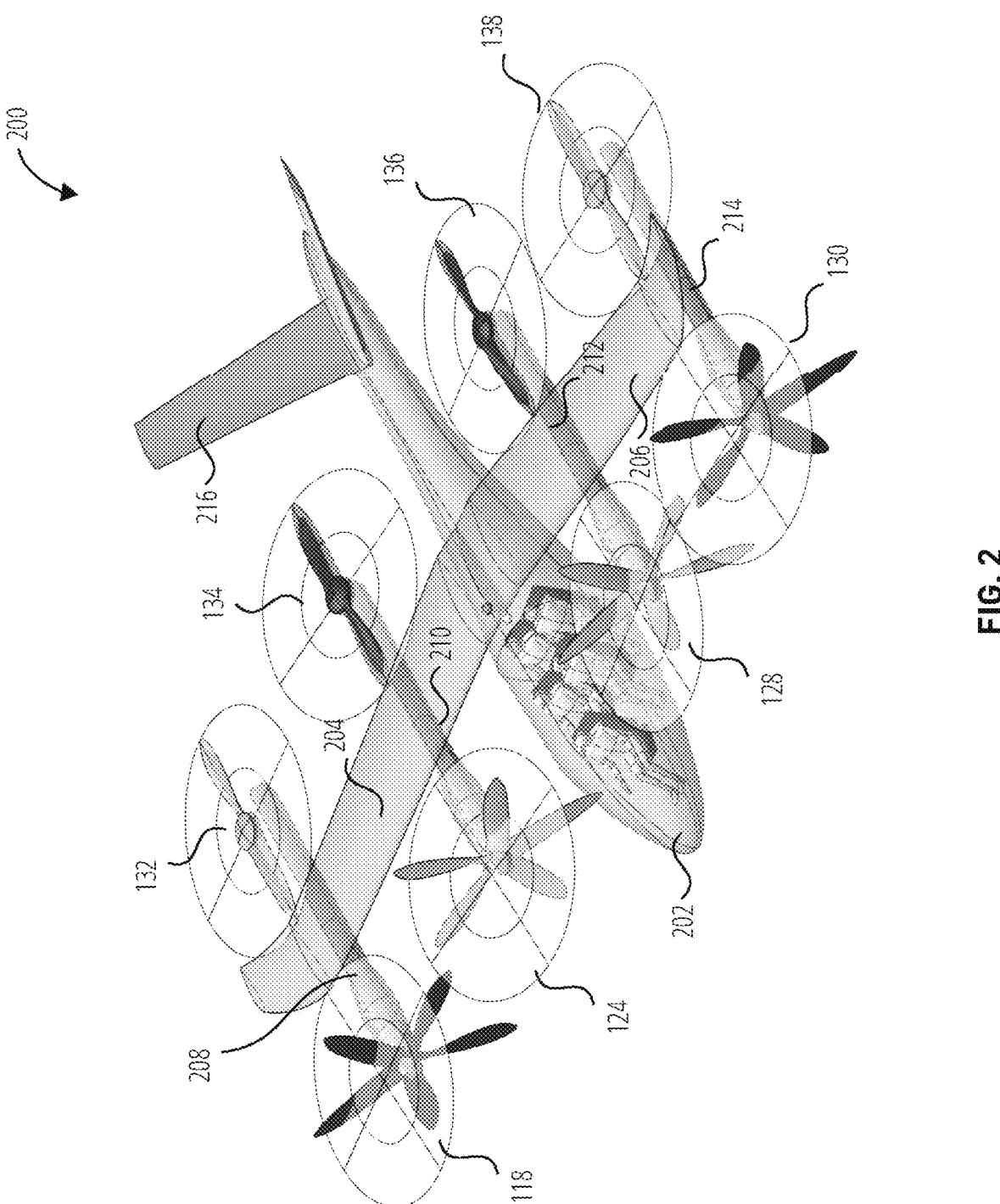
FIG. 2 illustrates an aerial vehicle 200, in accordance with some examples.

FIG. 2 is a perspective view of an aerial vehicle 200, according to some examples, which includes a fuselage 202, the fuselage 202 having a payload bay for operatively receiving and holding a payload (e.g., four passengers and a pilot, as well as cargo such as luggage).

The fuselage 202 also includes an avionics bay (e.g., such as the avionics bay 102 of FIG. 1) that houses the various systems and subsystems described with reference to FIG. 1).

The aerial vehicle 200 also includes a pair of wings, namely a starboard wing 204 and a port wing 206. A first set of booms, including a starboard outer wing boom 208 and a starboard mid-wing boom 210, are mounted on the starboard wing 204. Similarly, a second set of booms, including a port mid-wing boom 212 and a port outer wing boom 214, are mounted to an undersurface of the port wing 206.

A first set of tilt rotors, for example the tilt rotors 114, are respectively mounted at or adjacent forward ends of the starboard outer wing boom 208, starboard mid-wing boom 210, port mid-wing boom 212, and port outer wing boom 214. Further, a second set of fixed rotors, for example the fixed rotors 116, are respectively mounted at or adjacent aft ends of the starboard outer wing boom 208, starboard mid-wing boom 210, port mid-wing boom 212, and port outer wing boom 214.

Each of the tilt rotors 114, namely tilt rotor 118, tilt rotor 124, tilt rotor 128 and tilt rotor 130 are operationally tiltable, under control of the tilt control system 112, between a first vertical position in which the tilt rotors 114 provide vertical lift to the aerial vehicle 200 and a second horizontal position in which the tilt rotors 114 provide forward thrust and propulsion to the aerial vehicle 200. The tilting of the tilt rotors 114 also adjusts flow attachment across the starboard wing 204 and port wing 206.

A tail 216 is shown to be secured to the aft end of the fuselage 202. In one example, the tail 216 is a V-shaped detail as shown in FIG. 2

The aerial vehicle 200 uses tilting rotors (e.g., tilt rotors 114) forward of the wings (e.g., starboard wing 204 and port wing 206) to enable higher speeds and reduce lift-drag coefficients. Blowing of the wing by these tilt rotors 114 assists flow attachment across the transition envelope of the wings and improves the realizable lift coefficient (Cl). The fixed rotors 116 aid wing trailing edge flow circulation.

Figure 3:
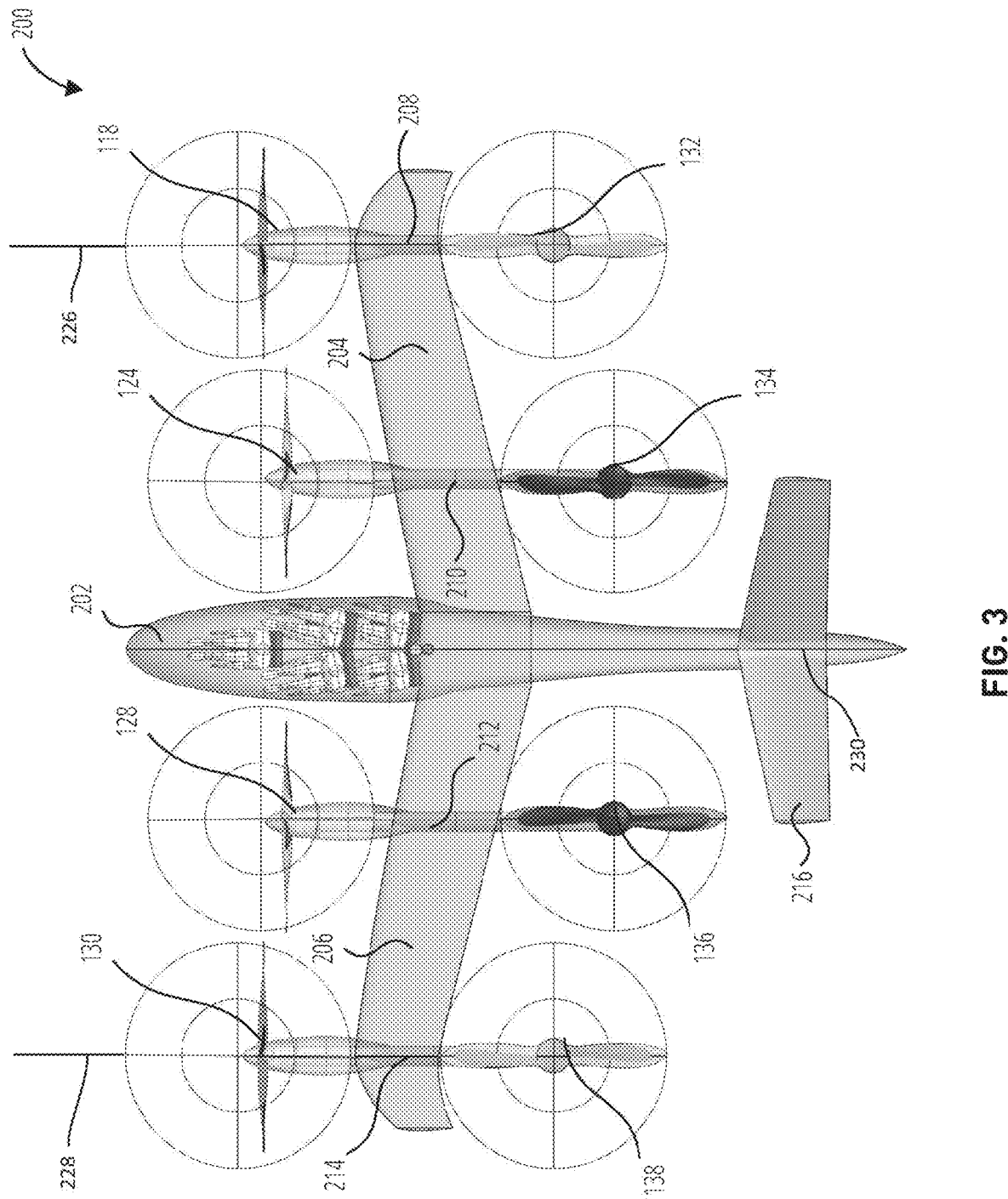
FIG. 3 illustrates an aerial vehicle 200, in accordance with some examples.

FIG. 3 is a top view of the aerial vehicle 200, according to some examples, in a cruise mode, in which the rotational axis of each of the tilt rotors 114 is horizontally aligned (so that the blades are vertically aligned) to provide forward propulsion for the aerial vehicle 200, while the fixed rotors 116 remain fixed with the rotational axes of the fixed rotors 116 vertically aligned to provide lift as necessary. Operationally in cruise mode, the fixed rotors 116 may each be locked, with the respective blades oriented as shown in FIG. 2, so that only the tilt rotors 114 are operated to provide forward propulsion for the aerial vehicle 200. In a further operational cruise mode, only selected ones of the fixed rotors 116 may be operational so as to provide flight stability for the aerial vehicle 200. For example, in FIG. 2, the fixed rotor 132 and the fixed rotor 138 may operationally rotate so as to provide stability, while the fixed rotor 134 and the fixed rotor 136 may be locked during a particular phase or stage of a cruise mode.

Figure 4:
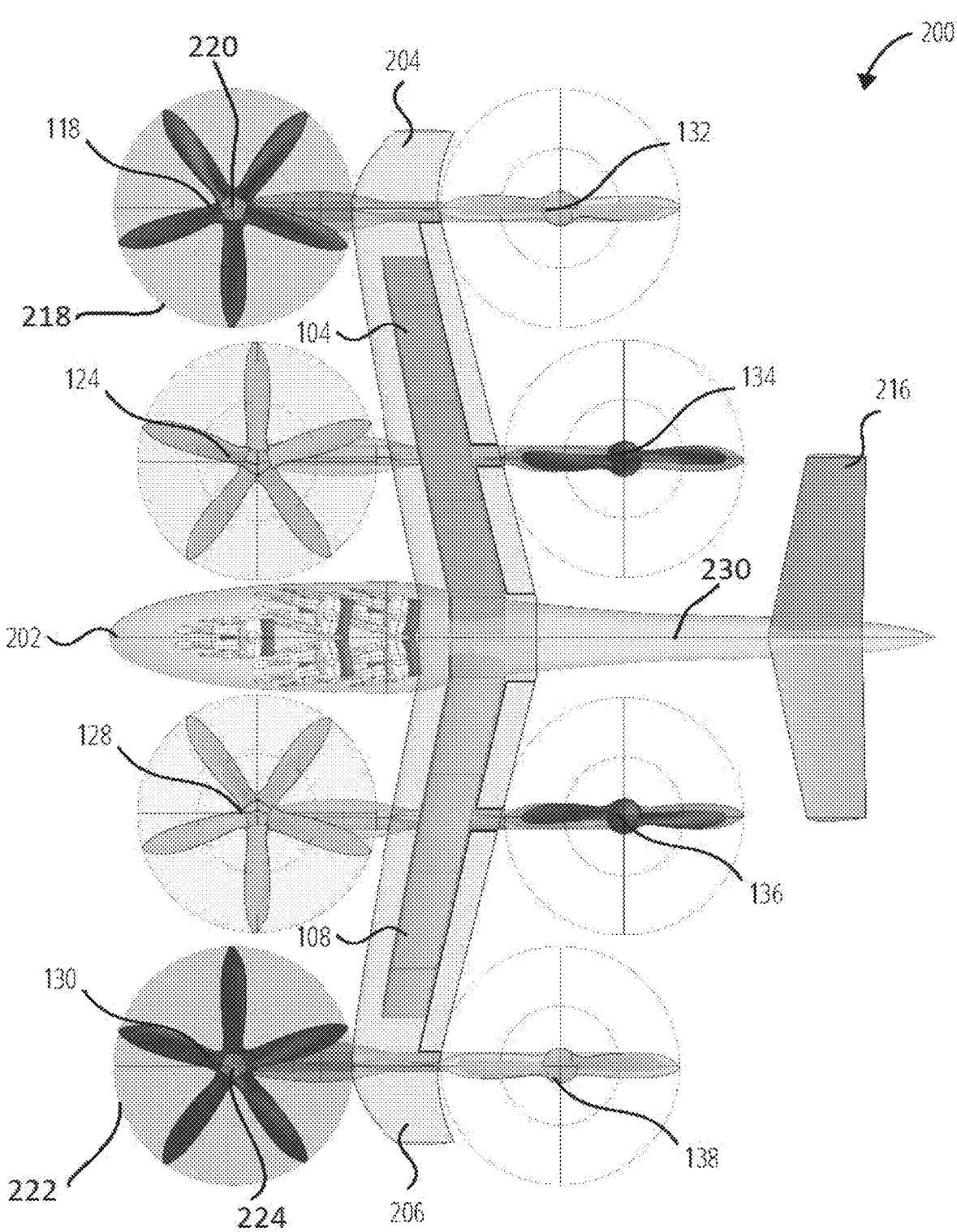
FIG. 4 illustrates an aerial vehicle 200, in accordance with some examples.

FIG. 4 is a top view of the aerial vehicle 200, according to some examples, further showing the location of a battery system, including battery unit 104 and battery unit 108 that are housed within each of the starboard wing 204 and port wing 206 of the aerial vehicle 200. The battery system, in one example, is composed of a number of discrete battery units which are electrically coupled and extend substantially along the length of each of the wings of the aerial vehicle 200. The battery system is furthermore electrically coupled so as to provide electric power to electric motors of each of the rotors of the aerial vehicle 200.

Figure 5:
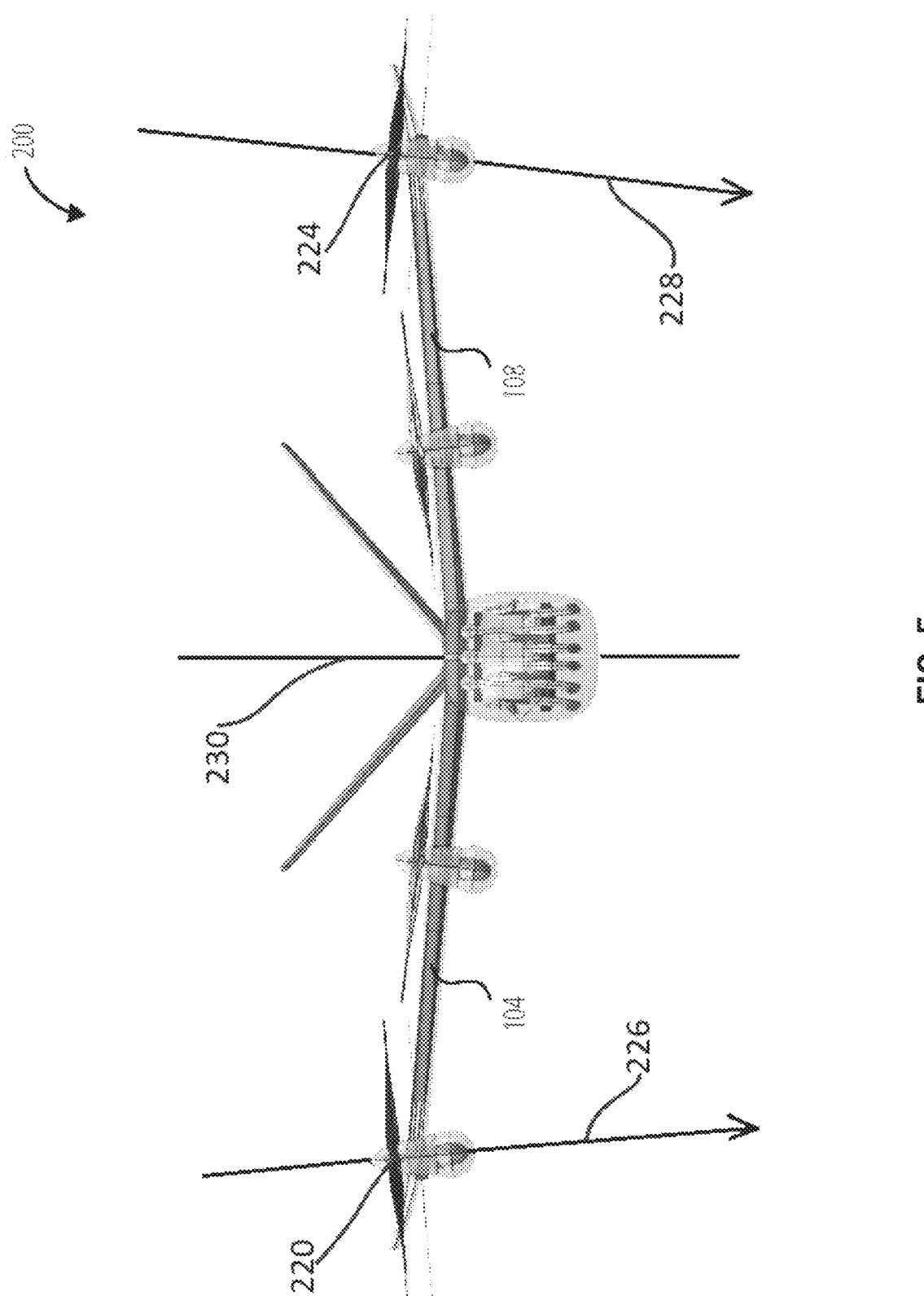
FIG. 5 illustrates an aerial vehicle 200, in accordance with some examples.

FIG. 5 is a front view of the aerial vehicle 200, according to some examples and provides a view of the aerial vehicle 200 in a hover mode (e.g., for lift/descend or takeoff/landing). In this mode, the rotational axes of the tilt rotors 114 are vertically aligned, so as to provide horizontal thrust and lift for the aerial vehicle 200. FIG. 5 also shows the location of the battery unit 104 in the starboard wing 204, and the battery unit 108 within the port wing 206 of the aerial vehicle 200.

Figure 6:
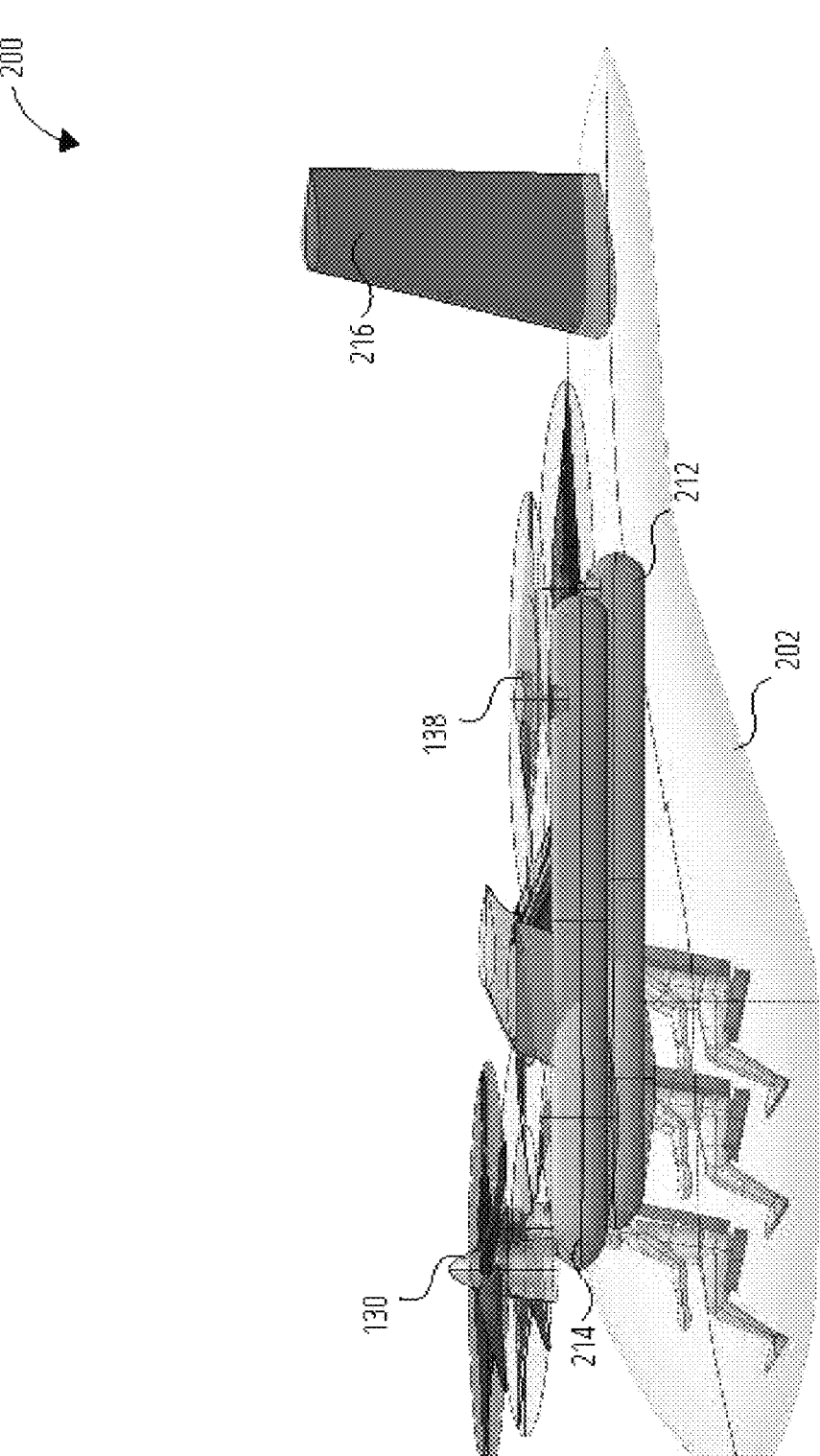
FIG. 6 illustrates an aerial vehicle 200, in accordance with some examples.

FIG. 6 is a side view of the aerial vehicle 200, according to some examples, again illustrating the aerial vehicle 200 in a hover mode (e.g., for lift/descend or takeoff/landing), with the tilt rotor 130 and fixed rotor 138 shown to be mounted to the port outer wing boom 214.

As can be seen from FIGS. 2-5, the aerial vehicle 200 includes a first tilt rotor 118 coupled to the starboard wing 204, the first tilt rotor 118 being operationally tiltable between a lift-generating position shown in FIGS. 4 and 5, and a thrust-generating position shown in FIGS. 2 and 3. The first tilt rotor 118 defines a first rotor disc plane 218 including a central first rotor disc plane point 220 (see FIG. 4). The aerial vehicle 200 includes a second tilt rotor 130 coupled to the port wing 206, the second tilt rotor 130 being operationally tiltable between a lift-generating position shown in FIGS. 4 and 5 and a thrust generating position shown in FIGS. 2 and 3 The second tilt rotor 130 defines a second rotor disc plane 222 including a central second rotor disc plane point 244.

As can be seen in at least in FIG. 5 from the upward and outward tilts of the first tilt rotor 118 and second tilt rotor 130, the central first rotor disc plane point 220 and the central second rotor disc plane point 224 are separated by a first distance when the first and second tilt rotors 118, 130 are in a lift-generating position, and the central first rotor disc plane point 220 and the central second rotor disc plane point 224 are separated by a second distance that is less than the first distance when the first and second tilt rotors are in a thrust-generating position. The aerial vehicle 200 also includes a first fixed rotor 138 coupled to the starboard wing 204 in a lift-generating position, and a second fixed rotor 138 coupled to the port wing in a lift-generating position.

As can be seen from FIGS. 2-5, the first tilt rotor 118 has a first spin axis 226 and the second tilt rotor 130 has a second spin axis 228. The first spin axis 226 and second spin axis 228 are substantially parallel to the sagittal plane of the fuselage when the first and second tilt rotors 118, 130 are in a thrust-generating position and the first and second spin axes intersect the sagittal plane 230 of the fuselage at a region beneath the starboard and port wings when the first and second tilt rotors 118, 130 are in a lift-generating position.

Figure 7:
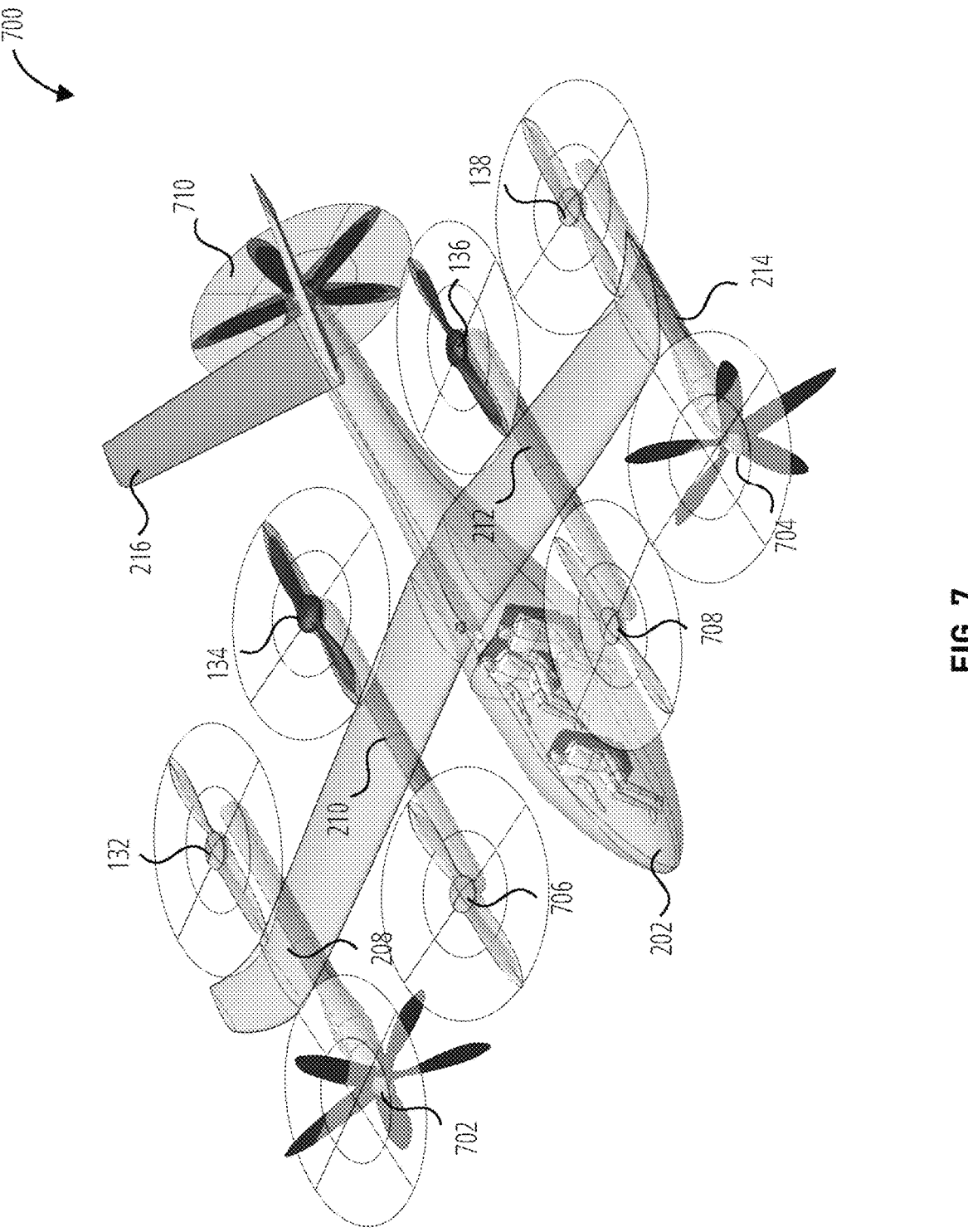
FIG. 7 illustrates an aerial vehicle 700, in accordance with some examples.

FIG. 7 is a perspective view of an aerial vehicle 700, according to further examples, in which the forward rotors include:

one pair of tilt rotors, namely outer starboard tilt rotor 702 and outer port tilt rotor 704, mounted at or adjacent to the forward ends of the starboard outer wing boom 208 and the port outer wing boom 214 respectively, and another a pair of fixed rotors, namely an inner starboard fixed rotor 706 and an inner port fixed rotor 708, mounted at or adjacent to the forward ends of the starboard mid-wing boom 210 and port mid-wing boom 212 respectively.

The aerial vehicle 700 also includes a rear fixed rotor 710, mounted at the aft end of the fuselage 202 and behind the tail 216.

FIG. 7 illustrates the aerial vehicle 700 in a cruise mode, in which the outer starboard tilt rotor 702 and outer port tilt rotor 704 are oriented with the rotational axes horizontally aligned so as to provide forward thrust. Further, the rotors whose blades are indicated in a dark shading (i.e., outer starboard tilt rotor 702, outer port tilt rotor 704, fixed rotor 134, fixed rotor 136, and rear fixed rotor 710) are engaged and rotating during the illustrated cruise mode, while the remaining rotors (e.g., inner starboard fixed rotor 706, inner port fixed rotor 708, fixed rotor 132 and fixed rotor 138) are locked.

Figure 8:
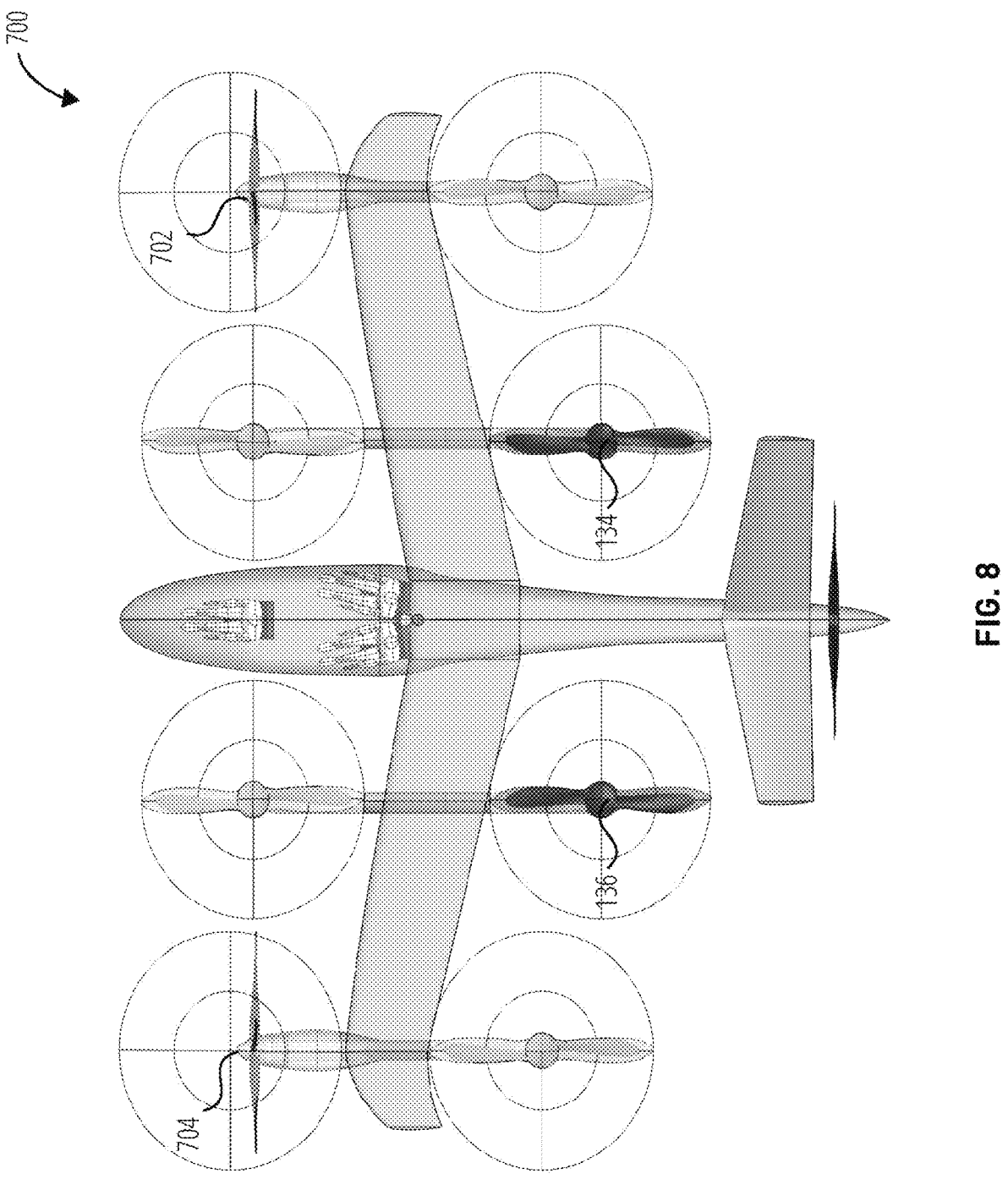
FIG. 8 illustrates an aerial vehicle 700, in accordance with some examples.

FIG. 8 is a top view of the aerial vehicle 700, according to some examples, again showing the aerial vehicle 700 in a cruise mode in which two tilt rotors (outer starboard tilt rotor 702 and outer port tilt rotor 704), forward of the wings, are engaged and two fixed rotors (fixed rotor 134 and fixed rotor 136), aft of the wings, are similarly engaged, while the remaining rotors are locked in the cruise mode.

Figure 9:
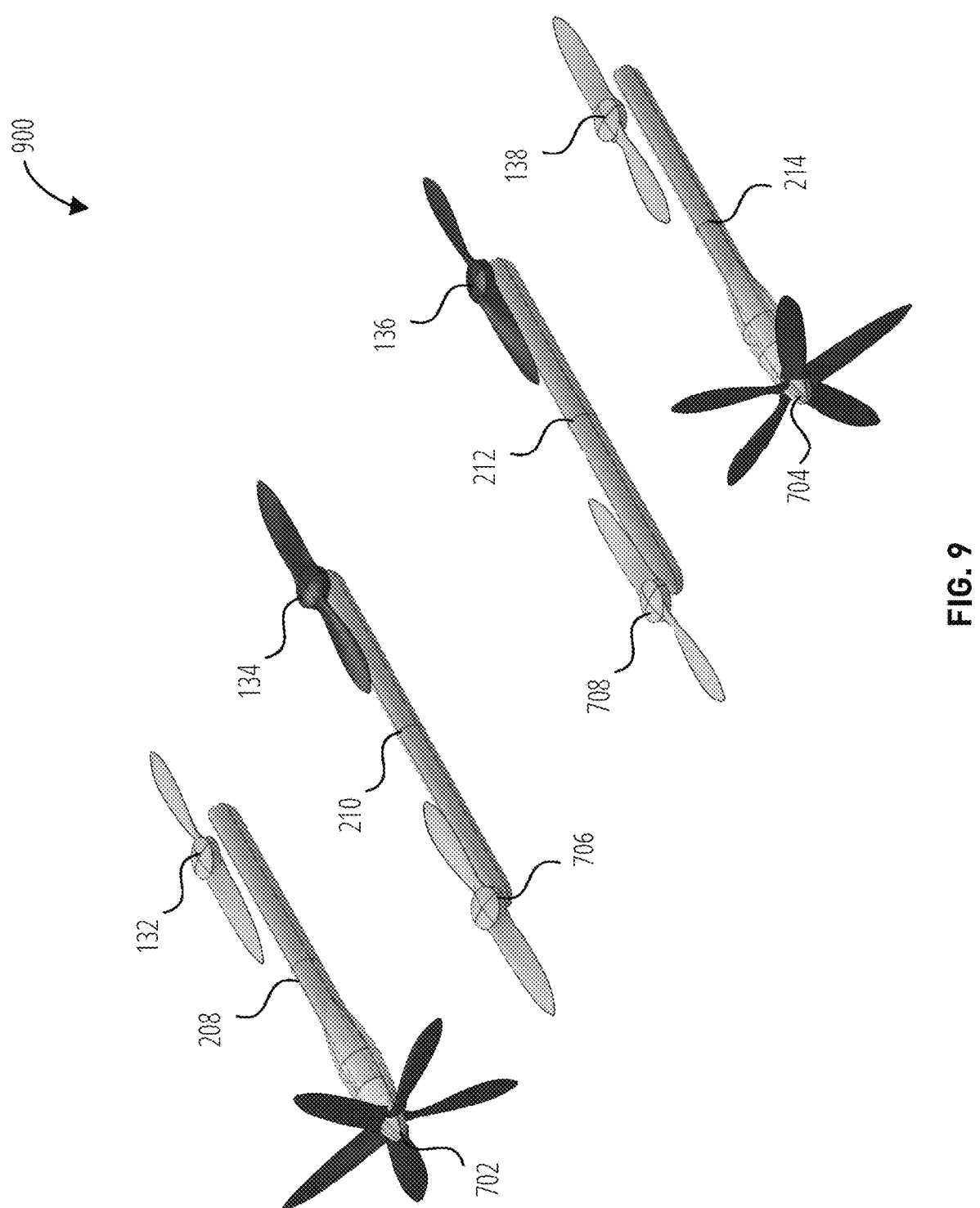
FIG. 9 illustrates boom assemblies 900, in accordance with some examples.

FIG. 9 is a diagram showing further details of the boom and rotor assemblies that may be mounted to the wings of the aerial vehicle 700, according to some examples, with the dark shaded rotors being operational during a cruise mode, while the light shaded rotors are fixed in this particular mode.

Figure 10:
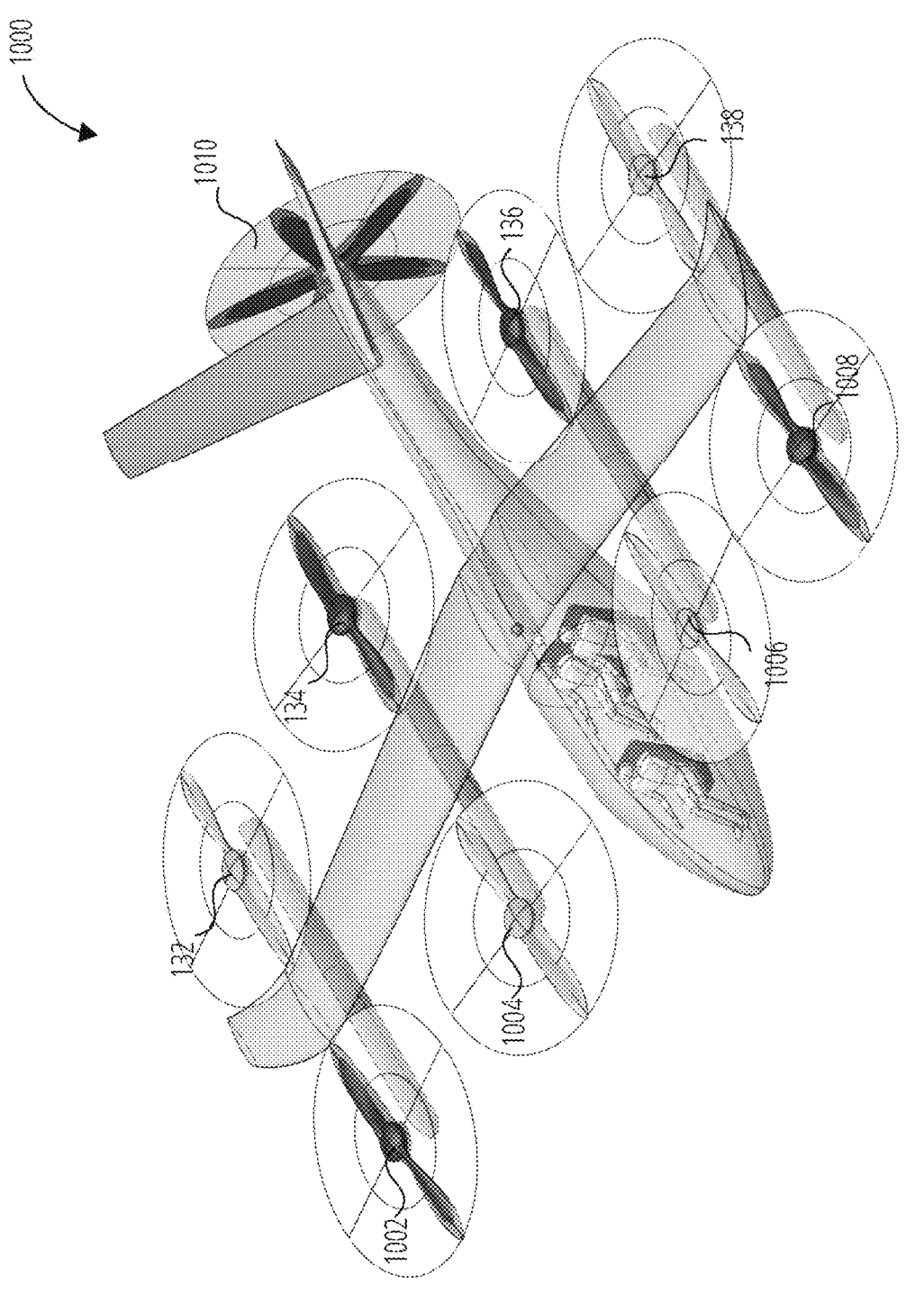
FIG. 10 illustrates an aerial vehicle 1000, in accordance with some examples.

FIG. 10 is a perspective view of an aerial vehicle 1000, according to yet further examples, in which each of the forward rotors, namely outer starboard fixed rotor 1002, inner starboard fixed rotor 1004, inner port fixed rotor 1006, and outer port fixed rotor 1008, are fixed rotors, as are each of the aft rotors, namely fixed rotor 132, fixed rotor 134, fixed rotor 136 and fixed rotor 138. The aerial vehicle 1000 also includes a rear fixed rotor 1010. FIG. 10 illustrates the aerial vehicle 1000 in a cruise mode, in which the rear fixed rotor 1010 is providing forward thrust, while a subset of the fixed rotors (e.g., outer starboard fixed rotor 1002, fixed rotor 134, fixed rotor 136 and outer port fixed rotor 1008) operationally provide some vertical thrust or propulsion so as to provide stability during flight to the aerial vehicle 1000. Specifically, the rotors of the aerial vehicle 1000 may be canted in various ways to provide robust control of the aerial vehicle 1000 in various states.

Figure 11:
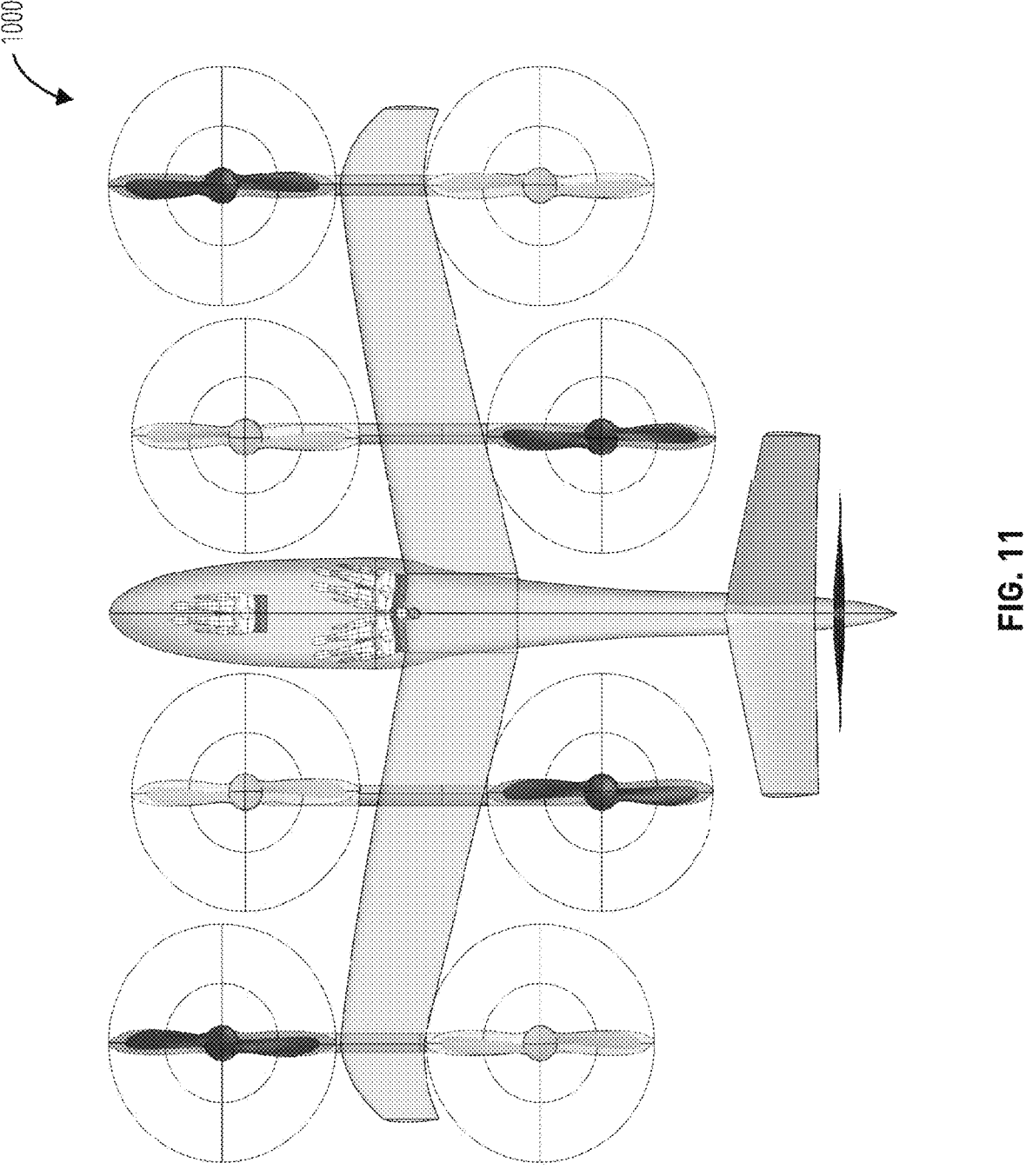
FIG. 11 illustrates an aerial vehicle 1000, in accordance with some examples.

FIG. 11 is a top view of the aerial vehicle 1000, according to the examples of FIG. 10, again illustrating in dark shading the fixed rotors that may be operational during a cruise mode of the aerial vehicle 1000. In a hover mode (or takeoff and landing mode), all of the fixed rotors attached to the booms may be engaged to provide needed vertical thrust and lift, while the rear fixed rotor 1010 may be used to provide additional horizontal propulsion.

FIG. 12 is a flowchart illustrating a method 3000, according to some examples, to manufacture an aerial vehicle. The method 3000 commences at block 3002 with the attachment of first and second wings to a fuselage, the fuselage, incorporating a payload bay to operatively receive and hold a payload.

At block 3004, a first set of booms (e.g., mid-wing and outer starboard wing booms) are mounted to the first wing and, at block 3006, and a second set of booms (e.g., mid-wing and outer port wing booms) are mounted to the second wing.

At block 3008, a first set of tilt rotors are attached at or adjacent first ends of the first and second booms. Similarly, at block 3010, a second set of fixed rotors are attached at or adjacent aft ends at each of the first and second sets of booms. The first set of tilt rotors are secured to the booms so as to be tiltable between a first vertical position and a second horizontal position to thereby provide a determined operational lift coefficient for the first wing and the second wing.

At block 3012, an avionics system and an electric motor control system are coupled within the aerial vehicle, the avionics system operatively to control the electric motor control system, which in turns controls both of the rotational direction and rotational speed of the first set of tilt rotors and the second set of fixed rotors.

At block 3014, a battery system is secured within each of the first and second wings, and the battery system is then electrically coupled to provide electric power to electric motors of each rotor of the first set of tilt rotors in the second set of fixed rotors.

Figure 13:
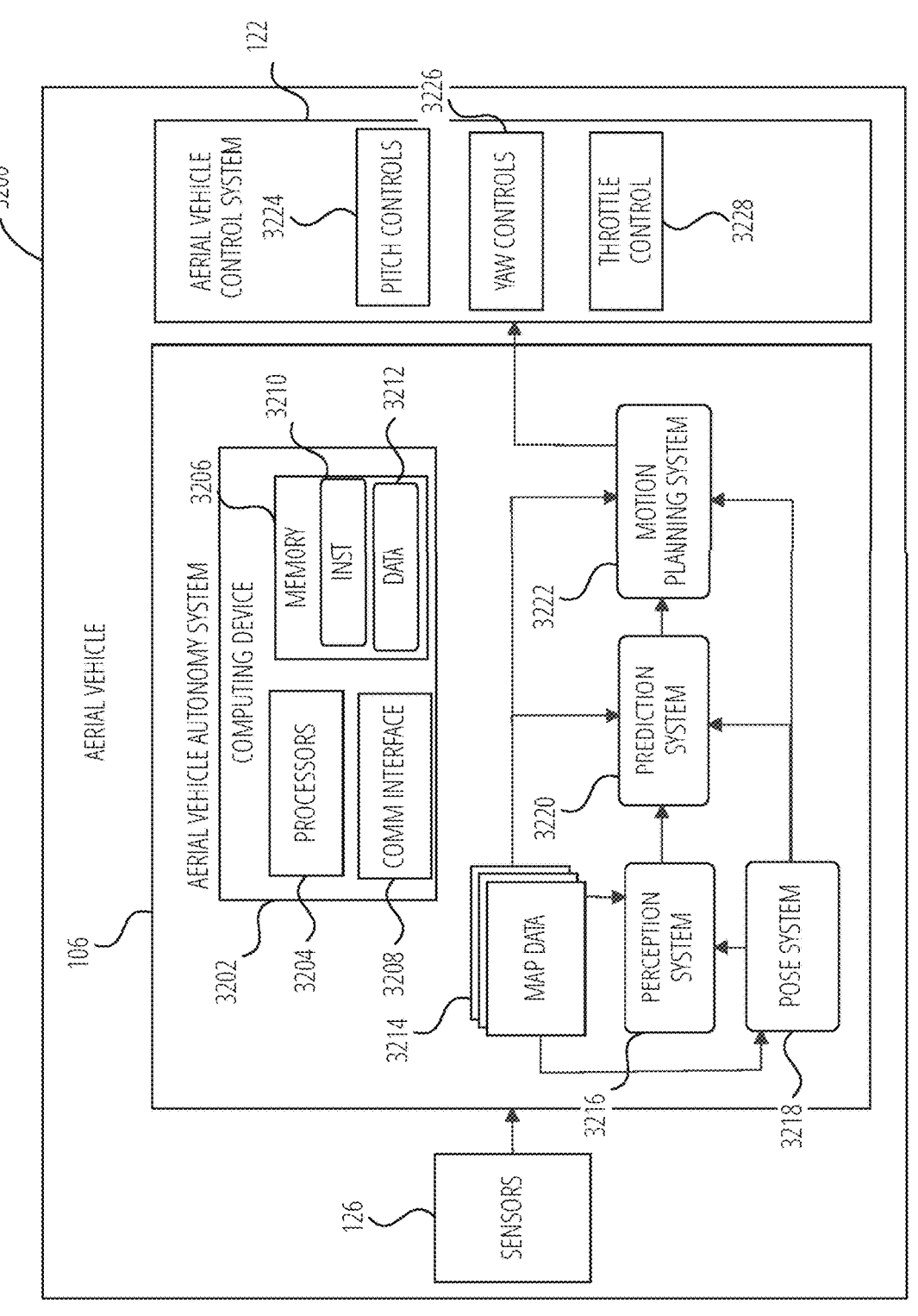
FIG. 13 is a diagrammatic representation of an autonomous vehicle system, in accordance with some examples.

FIG. 13 is a block diagram showing a system architecture of an aerial vehicle 3200, according to example aspects of the present disclosure. The aerial vehicle 3200 can be, for example, be an autonomous or semi-autonomous aerial vehicle. The aerial vehicle 3200 includes one or more sensors 126, an aerial vehicle autonomy system 106, and one or more aerial vehicle control system 122.

The aerial vehicle autonomy system 106 can be engaged to control the aerial vehicle 3200 or to assist in controlling the aerial vehicle 3200. In particular, the aerial vehicle autonomy system 106 receives sensor data from the sensors 126, attempts to comprehend the environment surrounding the aerial vehicle 3200 by performing various processing techniques on data collected by the sensors 126 and generates an appropriate motion path through an environment. The aerial vehicle autonomy system 106 can control the one or more aerial vehicle control system 122 to operate the aerial vehicle 3200 according to the motion path.

The aerial vehicle autonomy system 106 includes a perception system 3216, a prediction system 3220, a motion planning system 3222, and a pose system 3218 that cooperate to perceive the surrounding environment of the aerial vehicle 3200 and determine a motion plan for controlling the motion of the aerial vehicle 3200 accordingly.

Various portions of the aerial vehicle autonomy system 106 receive sensor data from the sensors 126. For example, the sensors 126 may include remote-detection sensors as well as motion sensors such as an inertial measurement unit (IMU), one or more encoders, etc. The sensor data can include information that describes the location of objects within the surrounding environment of the aerial vehicle 3200, information that describes the motion of the vehicle, etc.

The sensors 126 may also include one or more remote-detection sensors or sensor systems, such as a LIDAR, a RADAR, one or more cameras, etc. As one example, a LIDAR system of the sensors 126 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the sensors 126 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 126 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 126 can include a positioning system. The positioning system can determine a current position of the aerial vehicle 3200. The positioning system can be any device or circuitry for analyzing the position of the aerial vehicle 3200. For example, the positioning system can determine a position by using one or more of inertial sensors, a satellite positioning system such as a Global Positioning System (GPS), based on IP address, by using triangulation and/or proximity to network access points or other network components (e.g., cellular towers, Wi-Fi access points, etc.) and/or other suitable techniques. The position of the aerial vehicle 3200 can be used by various systems of the aerial vehicle autonomy system 106.

Thus, the sensors 126 can be used to collect sensor data that includes information that describes the location (e.g., in three-dimensional space relative to the aerial vehicle 3200) of points that correspond to objects within the surrounding environment of the aerial vehicle 3200. In some implementations, the sensors 126 can be located at various different locations on the aerial vehicle 3200.

The pose system 3218 receives some or all of the sensor data from the sensors 126 and generates vehicle poses for the aerial vehicle 3200. A vehicle pose describes the position (including altitude) and attitude of the vehicle. The position of the aerial vehicle 3200 is a point (or points) in a three-dimensional space. In some examples, the position is described by values for a set of Cartesian coordinates, although any other suitable coordinate system may be used. The attitude of the aerial vehicle 3200 generally describes the way in which the aerial vehicle 3200 is oriented at its position. In some examples, attitude is described by a yaw about the vertical axis, a pitch about a first horizontal axis and a roll about a second horizontal axis. In some examples, the pose system 3218 generates vehicle poses periodically (e.g., every second, every half second, etc.) The pose system 3218 appends time stamps to vehicle poses, where the time stamp for a pose indicates the point in time that is described by the pose. The pose system 3218 generates vehicle poses by comparing sensor data (e.g., remote sensor data) to map data 3214 describing the surrounding environment of the aerial vehicle 3200.

The pose system 3218 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 3218 generates vehicle poses. Accordingly, the pose filter generates some vehicle poses by extrapolating from previous pose estimates.

The perception system 3216 detects objects in the surrounding environment of the aerial vehicle 3200 based on the sensor data, the map data 3214 and/or vehicle poses provided by the pose system 3218. The map data 3214, for example, may provide detailed information about the surrounding environment of the aerial vehicle 3200. The map data 3214 can provide information regarding: the identity and location of geographic entities, such as different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the aerial vehicle autonomy system 106 in comprehending and perceiving its surrounding environment and its relationship thereto. The perception prediction system 3220 uses vehicle poses provided by the pose system 3218 to place aerial vehicle 3200 environment.

The perception system 3216 determines state data for objects in the surrounding environment of the aerial vehicle 3200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 3200; minimum path to interaction with the aerial vehicle 3200; minimum time duration to interaction with the aerial vehicle 3200; and/or other state information.

The perception system 3216 can determine state data for each object over a number of iterations. In particular, the perception system 3216 can update the state data for each object at each iteration. Thus, the perception system 3216 can detect and track objects, such as vehicles, that are proximate to the aerial vehicle 3200 over time.

The prediction system 3220 is configured to predict future positions for an object or objects in the environment surrounding the aerial vehicle 3200 (e.g., an object or objects detected by the perception system 3216). The prediction system 3220 can generate prediction data associated with objects detected by the perception system 3216. In some examples, the prediction system 3220 generates prediction data describing each of the respective objects detected by the perception system 3216.

Prediction data for an object can be indicative of one or more predicted future locations of the object. For example, the prediction system 3220 may predict where the object will be located within the next 5 seconds, 20 seconds, 200 seconds, etc. Prediction data for an object may indicate a predicted trajectory (e.g., predicted path) for the object within the surrounding environment of the aerial vehicle 3200. For example, the predicted trajectory (e.g., path) can indicate a path along which the respective object is predicted to travel over time (and/or the speed at which the object is predicted to travel along the predicted path). The prediction system 3220 generates prediction data for an object, for example, based on state data generated by the perception system 3216. In some examples, the prediction system 3220 also considers one or more vehicle poses generated by the pose system 3218 and/or the map data 3214.

The prediction system 3220 uses state data indicative of an object type or classification to predict a trajectory for the object. As an example, the prediction system 3220 can use state data provided by the perception system 3216 to determine that particular object (e.g., an object classified as a vehicle). The prediction system 3220 can provide the predicted trajectories associated with the object(s) to the motion planning system 3222.

The prediction system 3220 is also a goal-oriented prediction system that generates potential goals, selects the most likely potential goals and develops trajectories by which the object can achieve the selected goals. For example, the prediction system 3220 can include a scenario generation system that generates and/or scores the goals for an object and a scenario development system that determines the trajectories by which the object can achieve the goals. In some implementations, the prediction system 3220 can include a machine-learned goal-scoring model, a machine-learned trajectory development model, and/or other machine-learned models.

The motion planning system 3222 determines a motion plan for the aerial vehicle 3200 based at least in part on the predicted trajectories associated with the objects within the surrounding environment of the aerial vehicle 3200, the state data for the objects provided by the perception system 3216, vehicle poses provided by the pose system 3218, and/or the map data 3214. Stated differently, given information about the current locations of objects and/or predicted trajectories of objects within the surrounding environment of the aerial vehicle 3200, the motion planning system 3222 can determine a motion plan for the aerial vehicle 3200 that best navigates the aerial vehicle 3200 relative to the objects at such locations and their predicted trajectories on acceptable roadways.

The motion planning system 3222 evaluates cost functions and/or one or more reward functions for each of one or more candidate motion plans for the aerial vehicle 3200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 3222 can determine a total cost (e.g., a sum of the cost(s) and/or reward(s) provided by the cost function(s) and/or reward function(s)) of adhering to a particular candidate pathway. The motion planning system 3222 can select or determine a motion plan for the aerial vehicle 3200 based at least in part on the cost function(s) and the reward function(s). For example, the motion plan that minimizes the total cost can be selected or otherwise determined. The motion plan can be, for example, a path along which the aerial vehicle 3200 will travel in one or more forthcoming time periods. In some implementations, motion planning system 3222 can be configured to iteratively update the motion plan for the aerial vehicle 3200 as new sensor data is obtained from the sensors 126. For example, as new sensor data is obtained from the sensors 126, the sensor data can be analyzed by the perception system 3216, the prediction system 3220, and the motion planning system 3222 to determine the motion plan.

Each of the perception system 3216, the prediction system 3220, the motion planning system 3222, and the pose system 3218, can be included in or otherwise a part of the aerial vehicle 3200 configured to determine a motion plan based on data obtained from the sensors 126. For example, data obtained by the sensors 126 can be analyzed by each of the perception system 3216, the prediction system 3220, and the motion planning system 3222 in a consecutive fashion in order to develop the motion plan. While FIG. 13 depicts elements suitable for use in an aerial vehicle autonomy system 106 according to example aspects of the present disclosure, one of ordinary skill in the art will recognize that other vehicle autonomy systems can be configured to determine a motion plan for an autonomous aerial vehicle based on sensor data.

The motion planning system 3222 can provide the motion plan to aerial vehicle control system 122 to execute the motion plan. For example, the aerial vehicle control system 122 can include pitch control module 3224, yaw control module 3226, and a throttle control system 3228, each of which can include various vehicle controls (e.g., actuators or other devices or motors that control power) to control the motion of the aerial vehicle 3200. The various aerial vehicle control system 122 can include one or more controllers, control devices, motors, and/or processors.

A throttle control system 3228 is configured to receive all or part of the motion plan and generate a throttle command. The throttle command is provided to an engine and/or engine controller, or other propulsion system component to control the engine or other propulsion system of the aerial vehicle 3200.

The aerial vehicle autonomy system 106 includes one or more computing devices, such as the computing device 3202 which may implement all or parts of the perception system 3216, the prediction system 3220, the motion planning system 3222 and/or the pose system 3218. The example computing device 3202 can include one or more processors 3204 and one or more memory devices (collectively referred to as memory 3206). The processors 3204 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 3206 can include one or more non-transitory computer-readable storage mediums, such as Random-Access memory (RAM), Read Only memory (ROM), Electrically Erasable Programmable Read Only memory (EEPROM), Erasable Programmable Read Only memory (EPROM), flash memory devices, magnetic disks, etc., and combinations thereof. The memory 3206 can store instructions 3210 and instructions 3212 which can be executed by the processors 3204 to cause the aerial vehicle autonomy system 106 to perform operations. The computing device 3202 can also include a communications interface 3208, which can allow the computing device 3202 to communicate with other components of the aerial vehicle 3200 or external computing systems, such as via one or more wired or wireless networks. Additional descriptions of hardware and software configurations for computing devices, such as the computing device 3202 are provided herein.

EXAMPLES

Example 1. An aerial vehicle comprising:
a fuselage incorporating a payload bay to operatively receive a payload;
a first wing;
a first set of booms mounted to the first wing;
a second wing;
a second set of booms mounted to the second wing;
a first set of tilt rotors mounted at or adjacent forward ends of the first and second sets of booms; and
a second set of fixed rotors mounted at or adjacent aft ends of the first and second sets of booms,
wherein the first set of tilt rotors are operationally tiltable between a first vertical position and a second horizontal position to adjust flow attachment of the first wing and the second wing.

Example 2. The aerial vehicle according to any one or more of the examples, comprising an electric motor control system to control rotational direction and rotational speed of the first set of tilt rotors and the second set of fixed rotors.

Example 3. The aerial vehicle according to any one or more of the examples, comprising a tilt control system to control the first set of tilt rotors.

Example 4. The aerial vehicle according to any one or more of the examples, wherein the first wing is a starboard wing of the aerial vehicle, and the first set of booms includes at least an outer starboard wing boom and an mid-wing starboard wing boom, the second wing is a port wing of the area vehicle, and the second set of booms includes at least an outer port wing boom and an mid-wing port wing boom.

Example 5. The aerial vehicle according to any one or more of the examples, comprising a third set of fixed rotors mounted at or adjacent the forward ends of the first and second sets of booms.

Example 6. The aerial vehicle according to any one or more of the examples, wherein the first set of tilt rotors includes:

an outer starboard tilt rotor mounted at or adjacent a forward end of the outer starboard wing boom; and
an outer port tilt rotor mounted at or adjacent a forward end of the outer port wing boom.

Example 7. The aerial vehicle according to any one or more of the examples, wherein the first set of tilt rotors includes:
a mid-wing starboard tilt rotor mounted at or adjacent the forward end of the mid-wing boom; and
a mid-wing port tilt rotor mounted at or adjacent the forward end of the mid-wing port wing boom.

Example 8. The aerial vehicle according to any one or more of the examples, wherein the first set of tilt rotors comprises four tilt rotors, each mounted at or adjacent the respective forward ends of the outer starboard wing boom, the mid-wing starboard wing boom, the mid-wing port wing boom, and the outer port wing boom.

Example 9. The aerial vehicle according to any one or more of the examples, a battery system located within each of the first wing and the second wing, and electrically coupled to operatively provide electric power to electric motors of each rotor of the first set of tilt rotors and the second set of fixed rotors.

Example 10. The aerial vehicle according to any one or more of the preceding examples, wherein the battery system includes a plurality of battery units, with a first battery unit of the plurality of battery units being located within the first wing and a second battery unit of the plurality of battery units being located within the second wing.

Example 11. A method of manufacturing an aerial vehicle, the method comprising:
attaching a first wing and a second wing to a fuselage incorporating a payload bay for operatively receiving and holding a payload;
securing a first set of booms mounted to the first wing;
securing a second set of booms mounted to the second wing;
attaching a first set of tilt rotors at or adjacent forward ends of the first and second sets of booms; and
attaching a second set of fixed rotors at or adjacent aft end of the first and second sets of booms.

Glossary
"Aerial vehicle" refers to VTOL, CTOL, STOL and V/STOL aerial vehicles, and both manned and unmanned (e.g., drone) aerial vehicles.
"Airframe" refers to fuselage, booms, nacelles, cowlings, fairings, airfoil surfaces, and landing gear, as well as accessories and controls that go with these structures. The rotors of a helicopter or VTOL may serve the same purpose as the wings of a plane, and may be considered part of the airframe.
"Battery system" refers to a system including both battery packs or cells, and a battery management system (BMS) that manages a rechargeable battery (cell or battery pack), such as by protecting the battery from operating outside its safe operating area, monitoring its state, calculating secondary data, reporting that data, controlling its environment, authenticating it and/or balancing it.
"Lift coefficient" refers to a number that aerodynamicists use to model complex dependencies of shape, inclination, and some flow conditions on lift. The lift coefficient Cl is equal to the lift L divided by the quantity: density r times half the velocity V squared times the wing area A.

"Tilt jet" refers to "Tilt jet" refers to a propulsor that tilts its turbojet or turbofans, for example vertically for VTOL and then tilts them forwards for horizontal wing-borne flight, while the main wing, pylon or frame supporting the propulsor remains fixed in place.

"Tilt propulsor" refers to tilt rotor or a tilt jet.

"Tilt rotor" refers to a propulsor that tilts its propellers or rotors, for example vertically for VTOL and then tilts them forward for horizontal wing-borne flight, while the main wing, pylon or frame supporting the propulsor remains fixed in place.

"Tilt wing" refers to a wing that has its propulsors, propellers or rotors fixed to a wing and tilts a whole assembly to, for example, transition between vertical and horizontal flight or address other flight demands (such as a failure condition).

What is claimed is:

1. A vertical takeoff and landing (VTOL) aerial vehicle comprising:

a fuselage;

a starboard wing secured to the fuselage;

a port wing secured to the fuselage;

a first and second fixed rotor assembly, each comprising an electric motor and a propeller, coupled to the starboard wing;

a first outboard tilt rotor assembly, comprising an electric motor and a propeller, coupled to the starboard wing, the first outboard tilt rotor assembly being located outboard of the first and second fixed rotor assemblies and being operationally tiltable between a lift-generating position and a thrust-generating position, the first outboard tilt rotor assembly defining a first rotor disc plane including a central first rotor disc plane point, wherein the first outboard tilt rotor assembly has a greater number of propeller blades than a number of propeller of blades of the first fixed rotor assembly;

a third and fourth fixed rotor assembly, each comprising an electric motor and a propeller, coupled to the port wing; an a second outboard tilt rotor assembly, comprising an electric motor and a propeller, coupled to the port wing, the second outboard tilt rotor assembly being located outboard of the third and fourth fixed rotor assemblies and being operationally tiltable between a lift-generating position and a thrust-generating position, the second outboard tilt rotor assembly defining a second rotor disc plane including a central second rotor disc plane point, wherein the second outboard tilt rotor assembly has a greater number of propeller blades than a number of propeller of blades of the third fixed rotor assembly;

a starboard wing boom and a port wing boom coupled to the starboard wing and the port wing, respectively, wherein the first outboard tilt rotor assembly is coupled to the starboard wing boom, and wherein the second outboard tilt rotor assembly is coupled to the port wing boom; and a fifth and sixth fixed rotor assembly, each comprising an electric motor and a propeller, coupled to the respective starboard and port wing booms at a region aft of a trailing edge of the starboard and port wings, wherein the propeller of the fifth fixed rotor assembly and the propeller of the sixth fixed rotor assembly are positioned at a region above the respective wing booms;

wherein the central first rotor disc plane point and the central second rotor disc plane point are separated by a first distance when the first and second outboard tilt rotors assemblies are in a lift-generating position and the central first rotor disc plane point and the central second rotor disc plane point are separated by a second distance that is less than the first distance, when the first and second outboard tilt rotors assemblies are in a thrust-generating position.

2. The vertical takeoff and landing (VTOL) aerial vehicle of claim 1, wherein each of the first and second outboard tilt rotors assemblies are coupled to the respective starboard and port wing booms at a region forward of a leading edge of the starboard and port wings.

3. The vertical takeoff and landing (VTOL) aerial vehicle of claim 1 further comprising a V-tail coupled to and extending from a rear of the fuselage.

4. The vertical takeoff and landing (VTOL) aerial vehicle of claim 3, wherein the V-tail does not include a tilt rotor or a fixed rotor.

5. The vertical takeoff and landing (VTOL) aerial vehicle of claim 1, wherein the starboard and port wings comprise a starboard trailing edge and a port trailing edge, respectively, wherein at least a portion of the starboard trailing edge and the port trailing edge are forward swept.

6. The vertical takeoff and landing (VTOL) aerial vehicle of claim 3, wherein the starboard and port wings comprise a starboard trailing edge and a port trailing edge, respectively, wherein at least a portion of the starboard trailing edge and the port trailing edge are forward swept.

7. The vertical takeoff and landing (VTOL) aerial vehicle of claim 1, wherein the fixed rotor assemblies do not articulate between a lift-generating configuration and a thrust-generating configuration.

8. The vertical takeoff and landing (VTOL) aerial vehicle of claim 1, further comprising a first battery stored within the port wing and a second battery stored within the starboard wing, wherein each of the first and second batteries is electrically coupled to one or more of the fixed rotor assemblies.

9. The vertical takeoff and landing (VTOL) aerial vehicle of claim 1, wherein the first and second outboard tilt rotor assemblies are tilted upward in the lift-generating position.

10. The vertical takeoff and landing (VTOL) aerial vehicle of claim 1, wherein each of the first and second outboard tilt rotor assemblies has 5 propeller blades.

11. A vertical takeoff and landing (VTOL) aerial vehicle comprising:

a fuselage, having a longitudinal axis, a lateral axis, and a vertical axis, wherein the longitudinal axis and the vertical axis together define a sagittal plane;

a starboard wing secured to the fuselage;

a port wing secured to the fuselage;

a first and second fixed rotor assembly, each comprising an electric motor and a propeller, coupled to the starboard wing;

a first outboard tilt rotor assembly, comprising an electric motor and a propeller, coupled to the starboard wing, the first outboard tilt rotor assembly being outboard of the first and second fixed rotor assemblies and being operationally tiltable between a lift-generating position and a thrust-generating position, the first outboard tilt rotor assembly having a first spin axis;

a third and fourth fixed rotor assembly, each comprising an electric motor and a propeller, coupled to the port wing;

a second outboard tilt rotor assembly coupled to the port wing, the second outboard tilt rotor assembly being located outboard of the third and fourth fixed rotor assemblies and being operationally tiltable between a lift-generating position and a thrust-generating position, the second outboard tilt rotor assembly having a second spin axis;

a starboard wing boom and a port wing boom coupled to the starboard wing and the port wing, respectively, wherein the first outboard tilt rotor assembly is coupled to the starboard wing boom, and wherein the second outboard tilt rotor assembly is coupled to the port wing boom; and a fifth and sixth fixed rotor assembly, each comprising an electric motor and a propeller, coupled to the respective starboard and port wing booms at a region aft of a trailing edge of the starboard and port wings, wherein the propeller of the fifth fixed rotor assembly and the propeller of the sixth fixed rotor assembly are positioned at a region above the respective wing booms;

wherein the first spin axis and the second spin axis are substantially parallel to the sagittal plane of the fuselage when the first and second outboard tilt rotors assemblies are in a thrust- generating position and the first spin axis and the second spin axis intersect the sagittal plane of the fuselage at a region beneath the starboard and port wings when the first and second outboard tilt rotors assemblies are in a lift-generating position.

12. The vertical takeoff and landing (VTOL) aerial vehicle of claim 11, wherein the fixed rotor assemblies do not articulate between a lift-generating configuration and a thrust-generating configuration.

13. The vertical takeoff and landing (VTOL) aerial vehicle of claim 11 further comprising a V-tail coupled to and extending from a rear of the fuselage.

14. The vertical takeoff and landing (VTOL) aerial vehicle of claim 11, wherein the starboard and port wings comprise a starboard trailing edge and a port trailing edge, respectively, wherein at least a portion of the starboard trailing edge and the port trailing edge are forward swept.

15. The vertical takeoff and landing (VTOL) aerial vehicle of claim 11, further comprising a first battery stored within the port wing and a second battery stored within the starboard wing, wherein each of the first and second batteries are electrically coupled to one or more of the fixed rotor assemblies.

16. The vertical takeoff and landing (VTOL) aerial vehicle of claim 11, wherein each of the first and second outboard tilt rotor assemblies has 5 propeller blades.

* * * * *